UNITED STATES PATENT OFFICE.

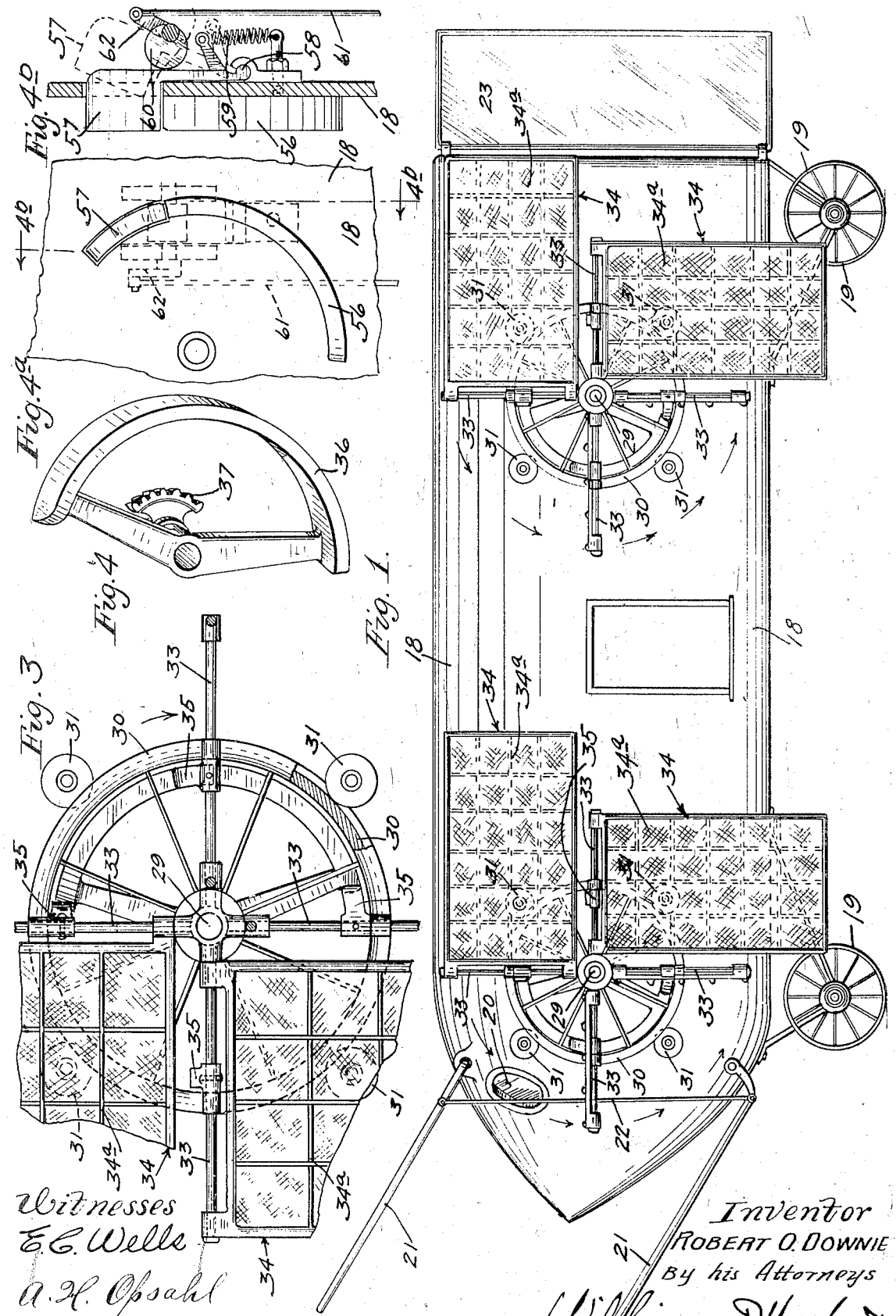

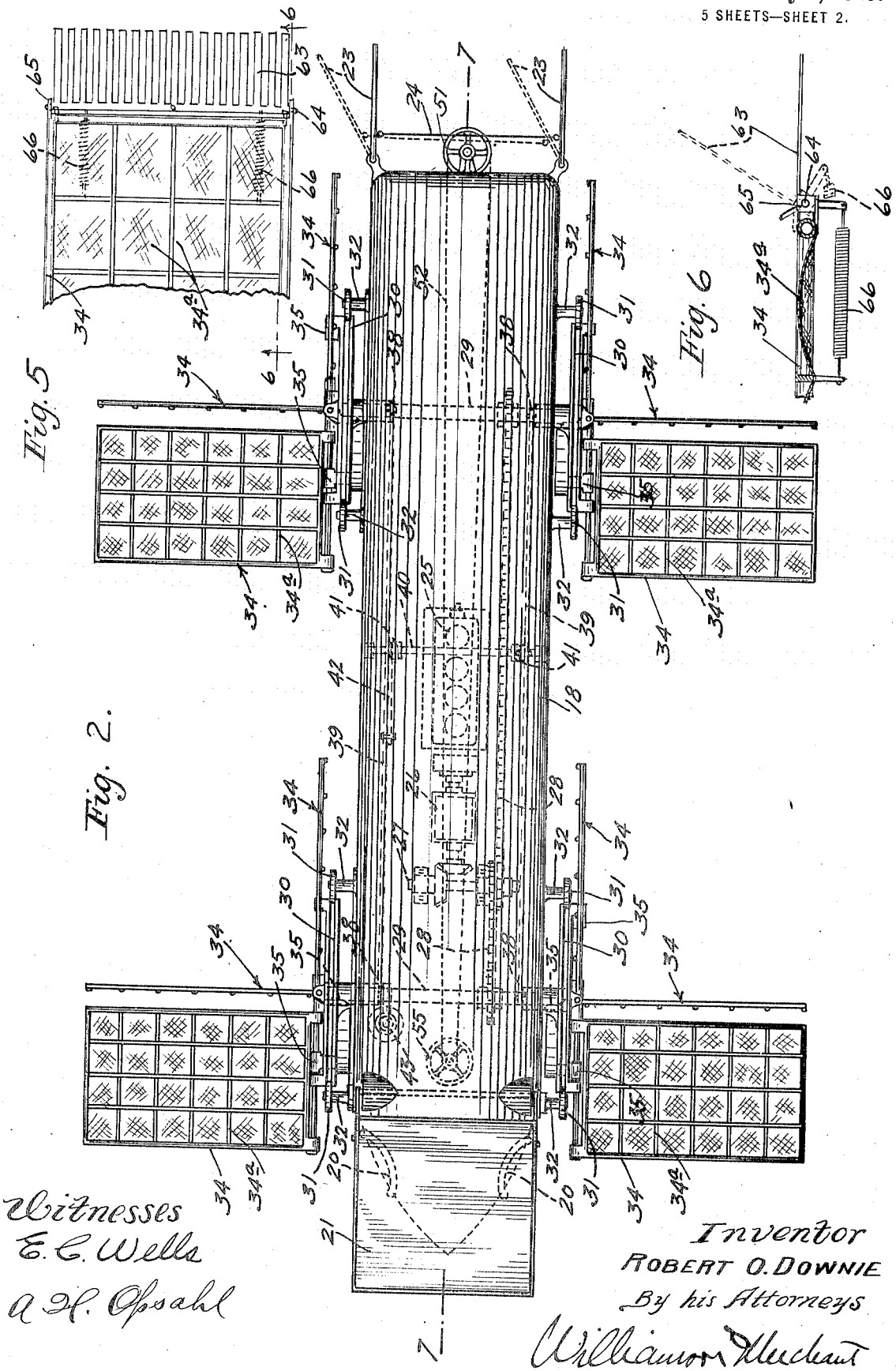

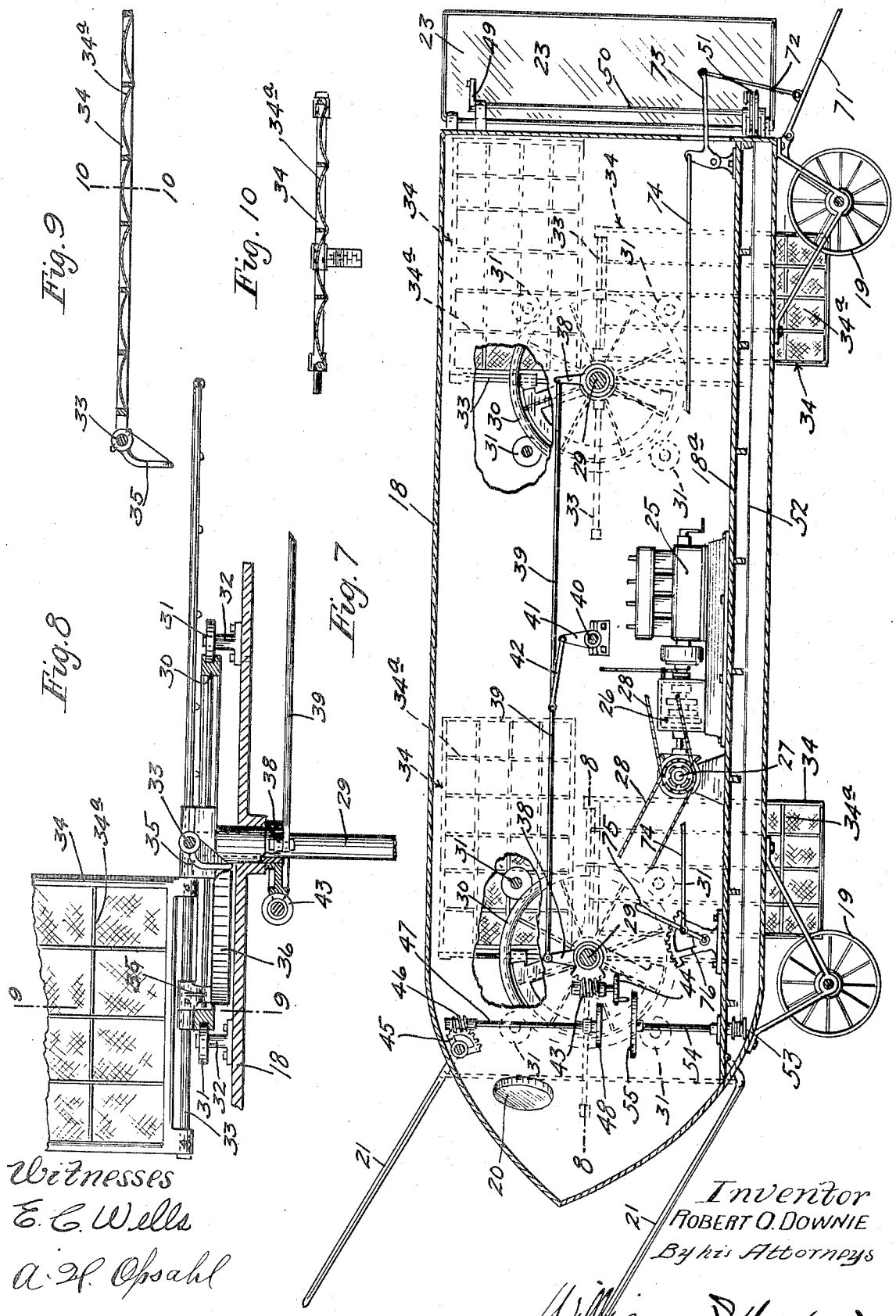

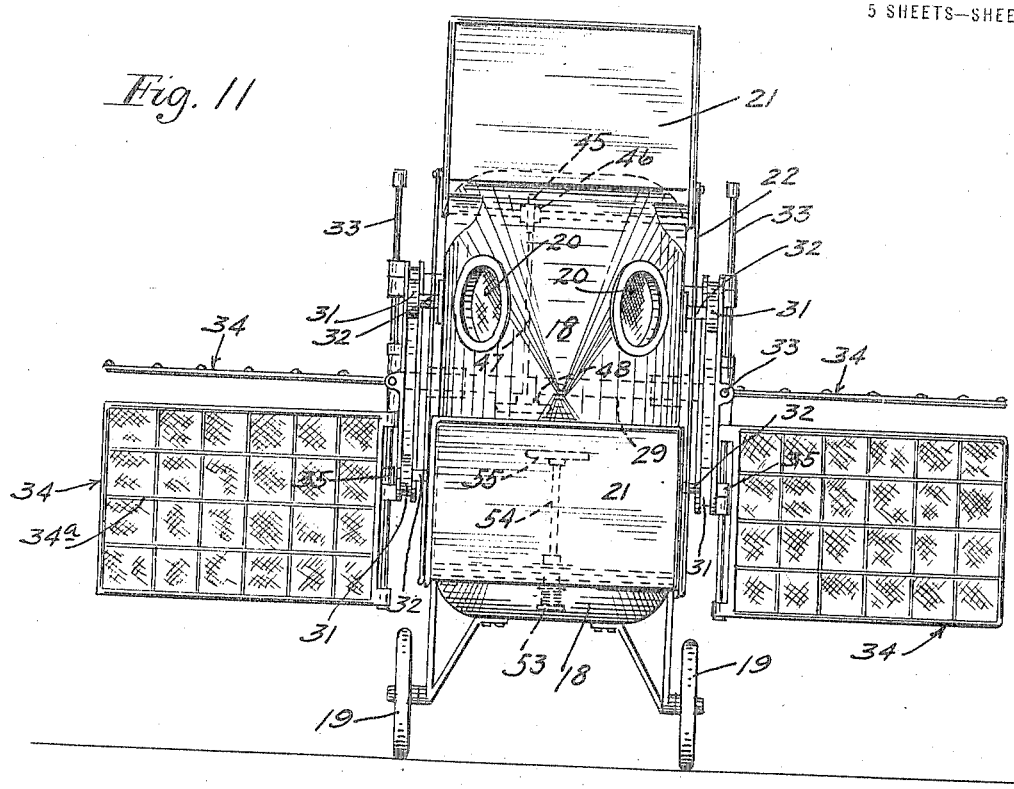

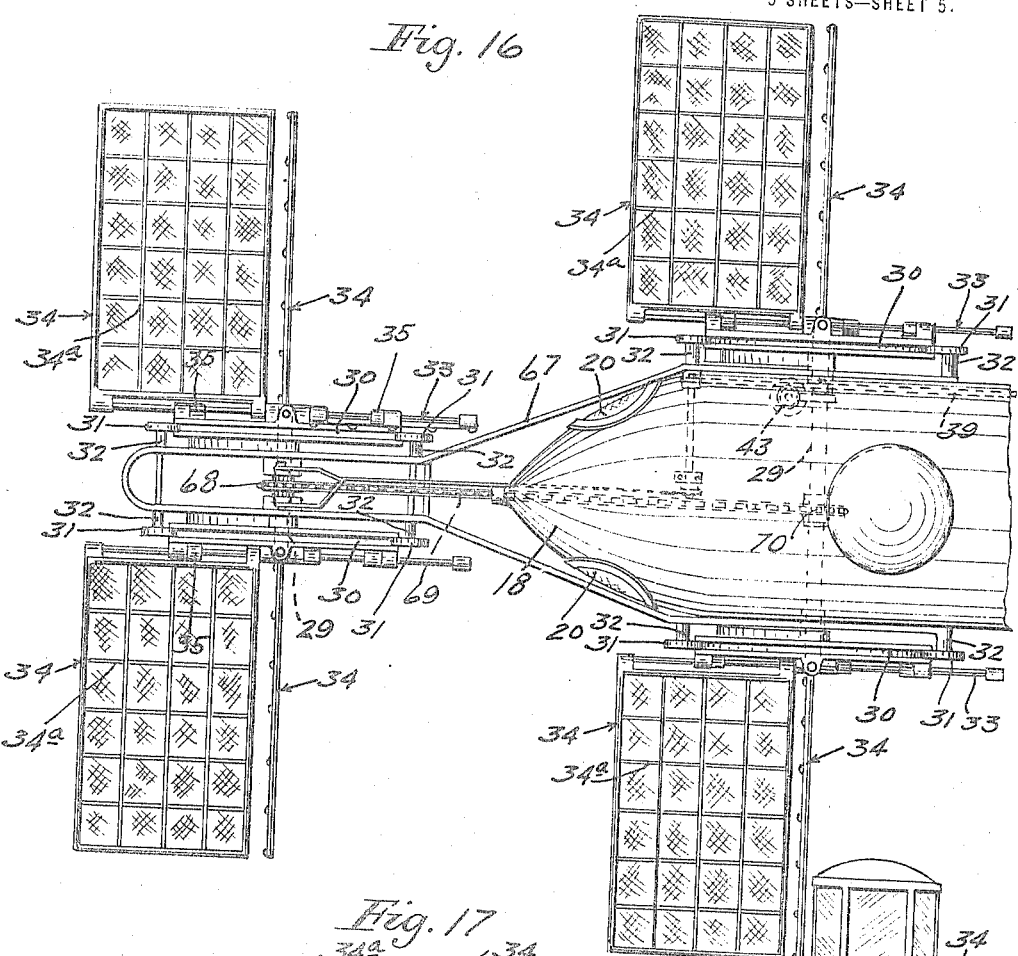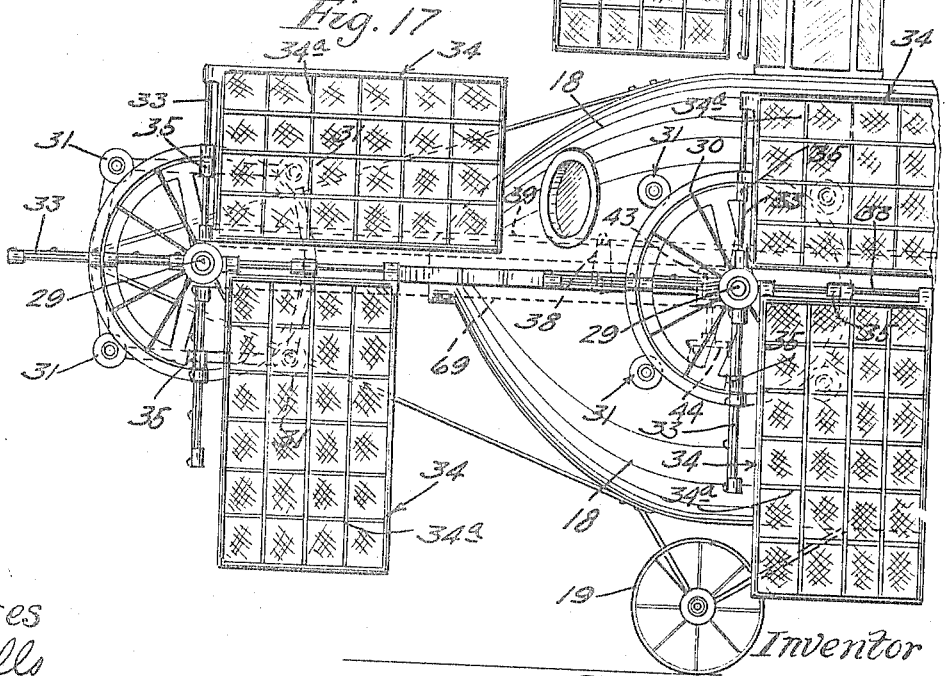

ROBERT O. DOWNIE, OF MINNEAPOLIS, MINNESOTA.

FLYING-MACHINE.

1,308,054.  Specification of Letters Patent.  Patented July 1, 1919.

Application filed May 10, 1918. Serial No. 233,770.

*To all whom it may concern:*

Be it known that I, ROBERT O. DOWNIE, a citizen of the United States, residing at Minneapolis, in the county of Hennepin and State of Minnesota, have invented certain new and useful Improvements in Flying-Machines; and I do hereby declare the following to be a full, clear, and exact description of the invention, such as will enable others skilled in the art to which it appertains to make and use the same.

My invention has for its object to provide improved propelling mechanism for flying machines, or for other machines or vehicles that are adapted to be propelled by the application of wings working in the air.

Generally stated, the invention consists of the novel devices and combinations of devices hereinafter described and defined in the claims.

This invention provides means for operating a multiplicity of wings in such manner that the wings may be manipulated to cause the machine to rise rapidly while advancing slowly, or may be caused to rise slowly while advancing rapidly, at the will of the operator.

In accordance with my invention, these wings are carried in series by rotating wheels or wing carriers and the wings are automatically extended and retracted so as to produce the desired upward or advancing effect.

One form of the invention is illustrated in the accompanying drawings wherein like characters indicate like parts throughout the several views.

Referring to the drawings;

Figure 1 is a side elevation of the flying machine embodying my invention;

Fig. 2 is a plan view of the same;

Fig. 3 is a fragmentary view in side elevation and with some parts sectioned, showing one of the wing carrying wheels and co-operating devices;

Fig. 4 is a perspective view of one of the wing projecting cams;

Fig. 4$^a$ is a detail in side elevation illustrating a modified form of the wing actuating cams shown in Fig. 4;

Fig. 4$^b$ is a section taken approximately on the line 4$^b$—4$^b$ of Fig. 4$^a$;

Fig. 5 is a plan view of one of the wings showing the same as provided with a wing tip nut illustrated in the other views noted but preferably inclined;

Fig. 6 is a section on the line 6—6 of Fig. 5;

Fig. 7 is a vertical section taken approximately on the line 7—7 of Fig. 2, some parts being broken away;

Fig. 8 is a horizontal section taken approximately on the line 8—8 of Fig. 7;

Fig. 9 is a section through one of the wings approximately on the line 9—9 of Fig. 8;

Fig. 10 is a transverse section taken on the line 10—10 of Fig. 9;

Fig. 11 is a front elevation of the machine;

Fig. 12 is a perspective view showing a slightly modified form of the cam illustrated in Fig. 4;

Fig. 13 is an elevation of the parts shown in Fig. 12, showing also one of the wing cranks;

Fig. 14 is a view corresponding to Fig. 12, but illustrating a modified form of the wing actuating cam;

Fig. 15 is an elevation of the cam shown in Fig. 14, showing also one of the wing cranks;

Fig. 16 is a plan view of the front portion of the machine illustrating a modification in which a pair of wings is applied in front of the machine; and Fig. 17 is a side elevation of the machine shown in Fig. 16.

Referring to the preferred form of machine illustrated in all of the views except Figs. 4$^a$ and 4$^b$, and 12 to 17, inclusive, the numeral 18 indicates the body of the machine which may take various forms, so far as this invention is concerned, but which is shown as in the form of a light hollow shell mounted to run on suitable wheels 19. This shell is adapted to contain the operator, and preferably, a number of other persons, depending on the size thereof, and it is provided in front with port holes 20 and with vertically adjustable elevator planes 21 shown as connected for common vertical angular adjustments by links 22.

Mounted at the rear of the shell or body is a pair of laterally adjustable steering rudders 23 connected for common horizontal angular adjustments by a cross link 24.

Within the shell is a suitable motor preferably a multi-cylinder explosive engine indicated, as an entirety, by the numeral 25. The crank shaft of this engine, through suitable transmission mechanism 26, drives a transverse counter shaft 27, and this counter shaft, through suitable sprocket and chain drives 28, drives front and rear transverse wheel axles 29 that are mounted in suitable bearings on the sides of the shell 18. Just outside of said shell, the said wheel axles 29 have rigidly secured wing carrying wheels 30. These wheels 30 have channeled rims in which work rollers 31 mounted on studs 32 secured to the exterior of the shell 18. These wheels 31 relieve the axles 29 from excessive strains and guide the exterior of the said wheels.

Each wheel 30 carries a plurality of radially projecting hinge rods 33 on which propelling wings 34 are hinged at their inner edges. These wings are preferably of skeleton form, comprising marginal frames and light plane forming cloth or webbing 34$^a$ that is adapted to form concave plane surfaces between the ribs of the wings, as best shown in Figs. 9 and 10.

The wings 34, at their hinged edges or ends, are provided with cam arms 35 that are subject to segmental cams 36 (see particularly Figs. 1, 2, 3 and 4) These segmental cams 36 are provided with axle hubs that are pivotally mounted on the respective wheel axles 29 and are provided with segmental pinions 37. The hubs of the cams 36 that are on the same side of the machine (see Figs. 7 and 8), are provided also with arms 38 that are connected by long rods 39, for common adjustments of the wing actuating cams that are on the same side of the machine. For imparting common adjustments to the wing actuating cams that are on opposite sides of the machine, a transverse rock shaft 40 is mounted in suitable bearings in the casings, and this shaft is provided with arms 41 connected by short links 42 to the respective rods 39. The hubs of one of the front wing actuating cams 36, only may be provided with a segmental gear 37 and this is engaged by a worm 43 that is mounted in a suitable fixed bearing and provided with an operating wheel 44. For imparting common adjustments to the two elevator planes 21, the pivot shaft of one thereof is provided with a segmental worm gear 45 that meshes with a worm 46 of a shaft 47, which shaft is mounted in suitable bearings within the machine casing and provided, preferably with an operating hand wheel 48.

The shell 18 is shown as provided with a raised flooring 18$^a$ upon which the motor and certain other parts are mounted. For imparting common adjustments to the two rudders 23, the rudder connecting cross rod 24 is connected to an arm 49 on the upper end of an upright rock shaft 50 mounted in suitable bearings on the rear end of the casing 18, and provided at its lower end with a sheave 51. An endless cable 52 runs around and is attached to the sheave 51 and, at its front portion, runs around a small sheave 53 secured to the lower end of a steering post 54 that is journaled in suitable bearings to the flooring 18$^a$ and is provided at its upper end with wheels 55. Here it may be observed that the above noted controlling wheels 44, 48 and 55 are locked in close proximity where they may be easily reached and manipulated by the operator in the vicinity of the port holes 20.

Operation.

The operation of the flying machine described, is substantially as follows:

It is not absolutely necessary that the wings be spring-retracted or spring drawn inward, but preferably, suitable springs, not shown, would be employed to draw them inward and cause engagement of their crank arms 35 subject to coöperating actuating cams 36. The said crank arms may be of the form shown in Figs. 8 and 9, or they may be equipped with rollers 35$^a$, as shown, for example, in Fig. 13. The wing carrying wheels will be rotated in the direction of the arrows marked on Fig. 1, and under rotation thereof, the wings will, of course, be revolved around the axes of the shafts 29, and the pressure of the wings will insure engagement of the arms 35 with the cams 36. When the arms 35 are engaged with the cams 36, the wings will be held outwardly projected, or in planes approximately at a right angle to the planes of rotation of the respective wheels, but when the said arms are out of engagement with said cams, the wings may fold back into planes parallel to the planes of the carrying wheels. The segmental cams 36 are so adjusted that the projection of the wings caused thereby will produce an upward and forward propelling action, and of course, by adjustments of the cams, the points where the wings will be thrown outward and retracted may be varied in a circumferential direction to vary the lifting and forward propelling action. Obviously, the adjustments of the said cams 36 may be easily accomplished by manipulation of the hand wheel 44.

The machine, of course, will be steered by the rudders 23. The rise or fall of the machine may also be varied by adjustments of the elevator planes 21. These elevator planes, however, in some instances, will be dispensed with. It will, of course, be understood that this machine may be made in any desired sizes, and that the number of wings on each wheel, as well as the number of wheel-equipped wings, may be very greatly varied.

The wing actuating cams 36 shown in detail in Fig. 4, will produce but one complete flop or oscillation of each wing under each complete rotation of its carrying wheel. In the construction illustrated, in Figs. 12 and 13, the segmental cam 36 is provided with a notch 36ª which will cause the cams to produce two complete flops of the wings for each rotation. In the form of cam shown in Figs. 14 and 15, the said cam is provided with a multiplicity of wave-like or corrugated cam surfaces 36ᵇ which will produce a plurality of oscillations on the wings for each rotation of the wheel.

Figs. 4ª and 4ᵇ illustrate a modified form of the segmental wing actuating cam in which the segmental cam 56 is provided with a retractable segmental section 57, the arm of which is pivoted to the shell 18 at 58 and is subject to a retracting spring 59, but is normally locked in an operative position by an eccentric 60 adapted to be manipulated by a rod 61 connected to an arm 62 of the said eccentric.

Preferably, the wings at their tips are provided with comb-like extensions 63, the teeth or blades of which are slightly flexible. These wing tips 63, at their ends, are provided with pivot trunnions 64 pivoted to ears 65 on the frames of the wings 34. Coiled springs 66, attached to projecting pins in the frames 35 and wing extensions 63 yieldingly hold the wing extensions in the planes of the wings, but the plane made, as shown in Fig. 6, permits them to yield, as indicated by dotted lines in said Fig. 6.

Figs. 16 and 17 illustrate a modified construction in which the elevator planes 21 are omitted and a pair of wing-equipped wheels such as just described, are applied to a strong bracket 67 rigidly secured to the casing 18 and project forward therefrom. The wings and their carrying wheels and intermediately associated devices are the same as previously described, and for the purpose of this case, it is only desirable to note that the wheel axles 29, in this instance, are journaled to the bracket 67; that the guide rollers 31 are supported by said brackets 67; and that the said forward axle 29 is provided with a sprocket 68 over which runs a sprocket chain 69. This sprocket chain 69 runs also over a sprocket 70 secured on the forward ends of the two front stud axles 29. These frictionally projected wing carrying wheels will be operated in unison with the other wings, and the wings may be controlled by cam devices of the same or similar character.

This machine has been described as a flying machine, but it may be used either in the form shown, or in a modified form for traveling over the ground or upon the surface of the water. It may be found serviceable for propelling water craft or for operating or propelling various different kinds of boats or machines over soft or marshy ground where traction upon the ground cannot be relied upon in the propelling or in the machine sustaining action.

It may be found desirable to provide one or more elevator blades at the rear of the machine. Hence I have, in Fig. 7, illustrated a possible arrangement of one of said planes. In the other views, the said extra rear plane is not shown, but in Fig. 7, this plane is indicated by the numeral 71. This plane is pivoted to a suitable bracket at the rear lower portion of the body or shell 18 and, by a link 72, is connected to one arm of a bell crank 73 pivoted to a suitable bearing on the raised floor 18ª. The other arm of this bell crank is engaged by a long rod 74 to an operating lever 75 that is pivoted to and adapted to be secured to notches of a latch arch 76 secured on the front portion of the platform 18ª.

What I claim is:

1. A machine of the kind described, comprising a body, laterally spaced front and rear wheels rotatably mounted adjacent to the sides of said body in vertical planes parallel to the longitudinal axis of said body, wings connected to said wheels by radial pivots and projecting entirely outward from said wheels, and means for rotating said wheels and for projecting and retracting said wings under rotation of said wheels, the said wheels having axial journals and peripheral guides, the latter being in the form of guide rollers.

2. A machine of the kind described comprising a body, rotary wing carriers mounted on said body, means for rotating said wing carriers, wings hinged to said wing carriers, and means for projecting and retracting said wings and for producing in the wing movements a secondary oscillating or quivering movement under rotation of said wing carriers.

3. A machine of the kind described comprising a body, rotary wing carriers mounted on said body, means for rotating said wing carriers, wings hinged to said wing carriers, and means for projecting and retracting said wings and for producing in the wing movements a secondary oscillating or quivering movement under rotation of said wing carriers, the said latter means comprising arms connected to said wings, and notched cams with which said arms engage under rotation of said wheel carriers.

In testimony whereof I affix my signature in presence of two witnesses.

ROBERT O. DOWNIE.

Witnesses:
CLARA DEMAREST,
F. D. MERCHANT.